(12) United States Patent  
Tomisawa

(10) Patent No.: US 7,412,590 B2  
(45) Date of Patent: Aug. 12, 2008

(54) INFORMATION PROCESSING APPARATUS AND CONTEXT SWITCHING METHOD

(75) Inventor: Shin-ichiro Tomisawa, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 344 days.

(21) Appl. No.: 11/229,850

(22) Filed: Sep. 20, 2005

(65) Prior Publication Data

US 2006/0101252 A1 May 11, 2006

(30) Foreign Application Priority Data

Sep. 21, 2004 (JP) ............................. 2004-274219

(51) Int. Cl.
 *G06F 9/52* (2006.01)
 *G06F 9/312* (2006.01)
(52) U.S. Cl. ..................... 712/228; 712/245
(58) Field of Classification Search ................. 712/228, 712/245
 See application file for complete search history.

(56) References Cited

U.S. PATENT DOCUMENTS 5,050,067 A * 9/1991 McLagan et al. ............ 718/108
5,666,523 A * 9/1997 D'Souza ..................... 712/229
5,713,038 A * 1/1998 Motomura .................... 712/41

FOREIGN PATENT DOCUMENTS

JP 7-141208 6/1995
JP 212371 8/1997

OTHER PUBLICATIONS

Michael Barr, "Programming Embedded Systems with C and C++", Ohm-sha Ltd. Apr. 2000, (pp. 180-181).

* cited by examiner

*Primary Examiner*—Daniel Pan
(74) *Attorney, Agent, or Firm*—Fish & Richardson P.C.

(57) ABSTRACT

An information processing apparatus which, when executing a plurality of predetermined units of processing, executes the predetermined units of processing in parallel by a processor by switching between contexts associated with the respective predetermined units. The processing apparatus comprises a plurality of register banks that respectively store the contexts associated with the respective predetermined units of processing, the processor that, after the context switching, executes processing associated with a foreground context, and a save/restore controller that, in parallel with the processor executing the processing associated with the foreground context, saves a background context to memory and restores the context of a unit of processing to be executed the next time from the memory to a background register bank.

13 Claims, 11 Drawing Sheets

INFORMATION PROCESSING APPARATUS AND CONTEXT SWITCHING METHOD

CROSS-REFERENCE TO RELATED APPLICATIONS

The present application claims priority from Japanese Patent Application No. 2004-274219 filed on Sep. 21, 2004, which is herein incorporated by reference.

BACKGROUND OF THE INVENTION

1. Field of the Invention

The present invention relates to an information processing apparatus and a context switching method.

2. Description of the Related Art

In recent years, computer systems that are embedded iii various machines and apparatuses and perform control tc) realize specific functions, so-called embedded systems, have been drawing attention, and their application to personal computer peripherals, audio-video equipment, electric appliances, and the like has been spreading rapidly. Moreover, so-called real-time capability to respond and process in a given time period after accepting a request to process is required of software (embedded software) for use in embedded systems. Hence, for embedded systems, a real-time operating system (hereinafter, called a "real-time OS") is often adopted.

As mentioned above, the real-time OS must ensure a response in a given time period, and hence adopt a multi-thread function or a multitask function as indispensable technology. The multithread function is a function wherein in a processor such as a CPU or MPU, one application process is divided into threads that are units of processing thereof and the execution rights of the threads are switched thereby processing the threads in parallel. The multitask function is a function wherein in a processor, each thread is further divided into a plurality of tasks that are units of processing and the execution rights of the plurality of tasks are switched thereby processing the tasks in parallel.

When a plurality of units of processing (threads, tasks processes, or the like) are switched, "contexts" for use in the units of processing are usually switched. Note that the context is associated with a respective unit of processing and includes current flag status of a register set (general purpose registers, status registers, a program counter, and the like) and information for execution of the unit of processing. The definition of the context is according to that described in Michael Barr, "Programming Embedded Systems with C and C++", Ohm-sha, Ltd., April 2000, pp. 180-181 (or O'Reilly, January 1999).

FIG. 9 is a diagram for explaining the operation of context switching in a conventional embedded system (hereinafter, called "conventional example 1"). As shown in the Figure, the conventional embedded system essentially comprises a CPU 10, a register bank 11 that stores a context, and a memory 12 external to the CPU 10 for saving/restoring contexts. After accepting a request to switch contexts from the real-time OS (step 0), the CPU 10 saves a context A now being executed from the register bank 11 into the memory 12 by a store instruction (step 1). Then, the CPU 10 restores a next context B from the memory 12 and updates the contents of the register bank 11 therewith by a load instruction (step 2). Such a conventional example 1 is disclosed in, for example, Japanese Patent Application Laid-Open Publication No. H09-212371.

FIG. 10 is a diagram for explaining the operation of context switching in another conventional embedded system (hereinafter, called "conventional example 2"). As shown in the Figure, the conventional embedded system essentially comprises a CPU 10, a plurality of register banks 11 that are associated with and exclusively used by respective tasks, a selector 13 that selects one of respective contexts stored in the plurality of register banks 11. Here, assume that the CPU 10 is executing a task A with a context A stored in a register bank 11 (#0) via the selector 13 (step 0). After accepting a request to switch contexts from the real-time OS, the CPU 10 selects a register bank 11(#1) storing a context B with the selector 13 (step 1). As a result, context switching from context A to context B is carried out (step 2). That is, in conventional example 2, without saving/restoring a context into/from an external memory, context switching is carried out only by switching the register banks 11. Such conventional example 2 is disclosed in, for example, Japanese Patent Application Laid-Open Publication No. H07-141208.

FIG. 11 shows how contexts A to C associated with respective tasks A to C are also switched as the tasks A to C are switched according to a given task scheduling (of A to B to C to A to . . . ) in conventional example 1 of FIG. 9. In conventional example 1, when switching contexts, the CPU 10 saves the status of the context currently granted an execution right into the memory 12 by a store instruction, and restores the status of a context to be granted an execution right from the memory 12 by a load instruction.

That is, in conventional example 1, the CPU 10 saves/restores contexts by repeating execution of a store instruction/load-instruction. As a result, context switching takes some time (overhead), and accordingly responsiveness in task switching and execution, so-called real-time capability is poorer. Furthermore, the CPU 10 cannot execute another application during the saving/restoring, thus affecting adversely the real-time capability.

Meanwhile, in conventional example 2 of FIG. 10 saving/restoring of contexts into/from an external memory is not performed, and accordingly high-speed context switching can be achieved. However, a hardware resource usually provided as register banks is limited, and thus this configuration is hardly realistic for other than embedded systems on a relatively small scale with a small number of contexts to be handled.

SUMMARY OF THE INVENTION

To solve the above problem, according to a main aspect of the present invention there is provided an information processing apparatus which, when executing a plurality of predetermined units of processing, executes the predetermined units of processing in parallel by switching between contexts associated with the respective predetermined units, the processing apparatus comprising a plurality of register banks; that respectively store the contexts associated with the respective predetermined units of processing, a processor that, in the context switching, grants a right of execution to a context stored in one of the plurality of register banks and executes a unit of processing associated with the context having the right of execution granted, and a save/restore controller that performs saving and restoring wherein the saving executes to read out a context having handed over the right of execution from one of the other register banks than the one register bank storing the context having the right of execution granted and write into a memory accessible by the processor, and the restoring executes to read out a context to be granted the right of execution the next time from the memory and write into the one of the other register banks.

According to the present invention, there is provided an information processing apparatus and its context switching method suitable for a real-time system.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

<Basic Configuration/Operation of an Information Processing Apparatus>

Figure 1:
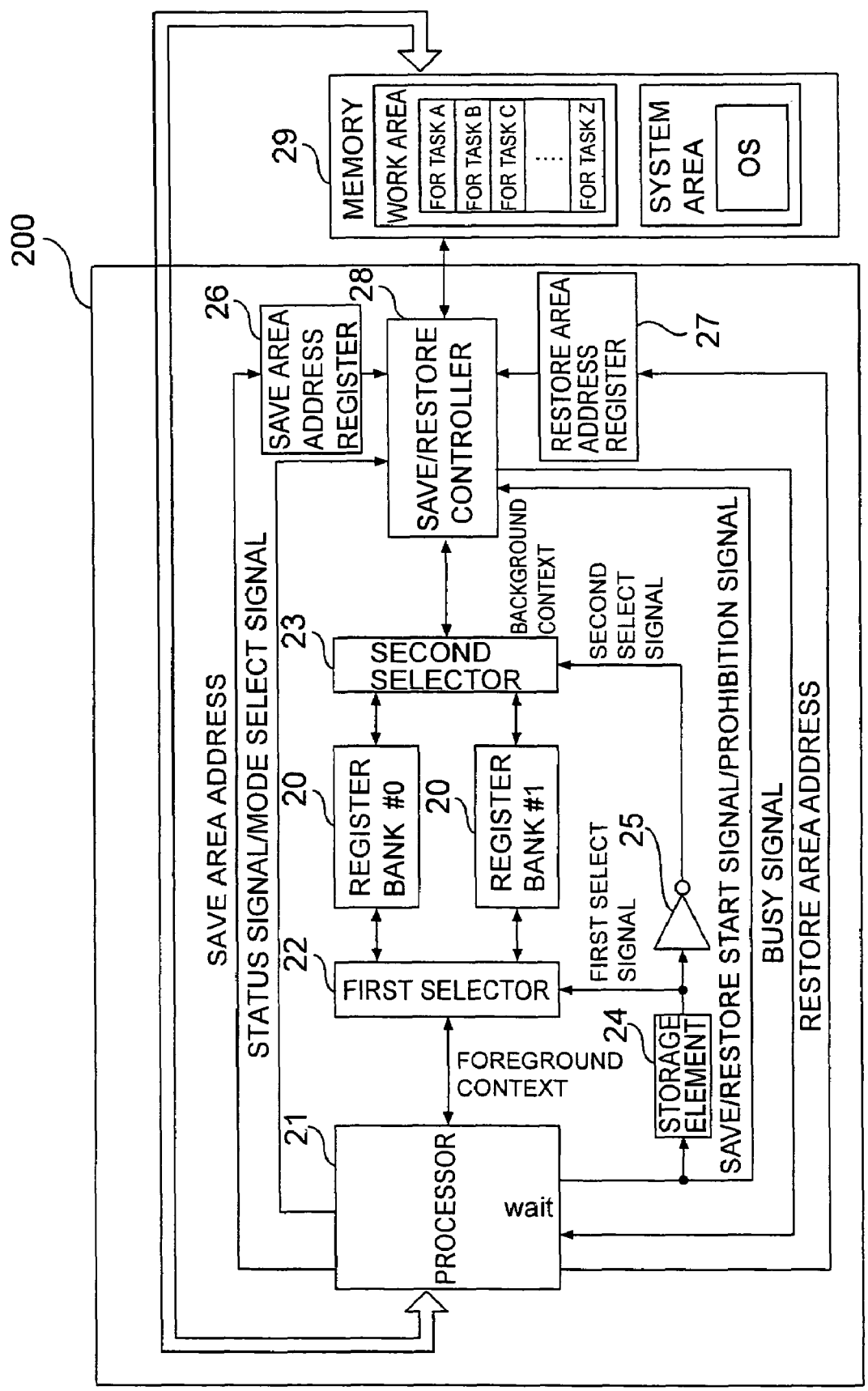
FIG. 1 is a diagram explaining the configuration of an information processing apparatus according to an embodiment of the present invention.

FIG. 1 illustrates the configuration of an information processing apparatus 200 according to an embodiment of the present invention. The information processing apparatus 200 is embodied in the form of a semiconductor integrated circuit as an embedded system having incorporated therein a real-time OS (ITRON (Industrial TRON; TRON stands for "The Real-time Operating system Nucleus"), or the like) whose application to personal computer peripherals, audio-video equipment, electric appliances, and the like has been spreading in recent years.

Moreover, assume that in the information processing apparatus 200, the multithread/multitask function is realized by the real-time OS. That is, when having a processor 22 execute predetermined units of processing (thread/task/process) in plurality, the information processing apparatus 200 switches contexts associated with the respective units of processing, each of the contexts including current flag status of a register set (general-purpose registers status registers, a program counter, and the like) and information for execution of the unit of processing, thereby having the processor 21 execute the plurality of units of processing in parallel.

The information processing apparatus 200 comprises the processor 21, two register banks 20(#0, #1), a first selector 22, a second selector 23, a storage element 24, an inverter element 25, a save area address register 26, a restore area address register 27, and a save/restore controller 28. Note that a memory 29 may be provided external to the information processing apparatus 200 or incorporated in the information processing apparatus 200.

The two register banks 20(#0, #1) are each a register file group managed as a bank, and store a context that is in a state of being granted a right of execution by the processor 21 and a context to be saved/restored, respectively. As such the information processing apparatus 200 is configured simply to have two register banks 20.

Figure 2:
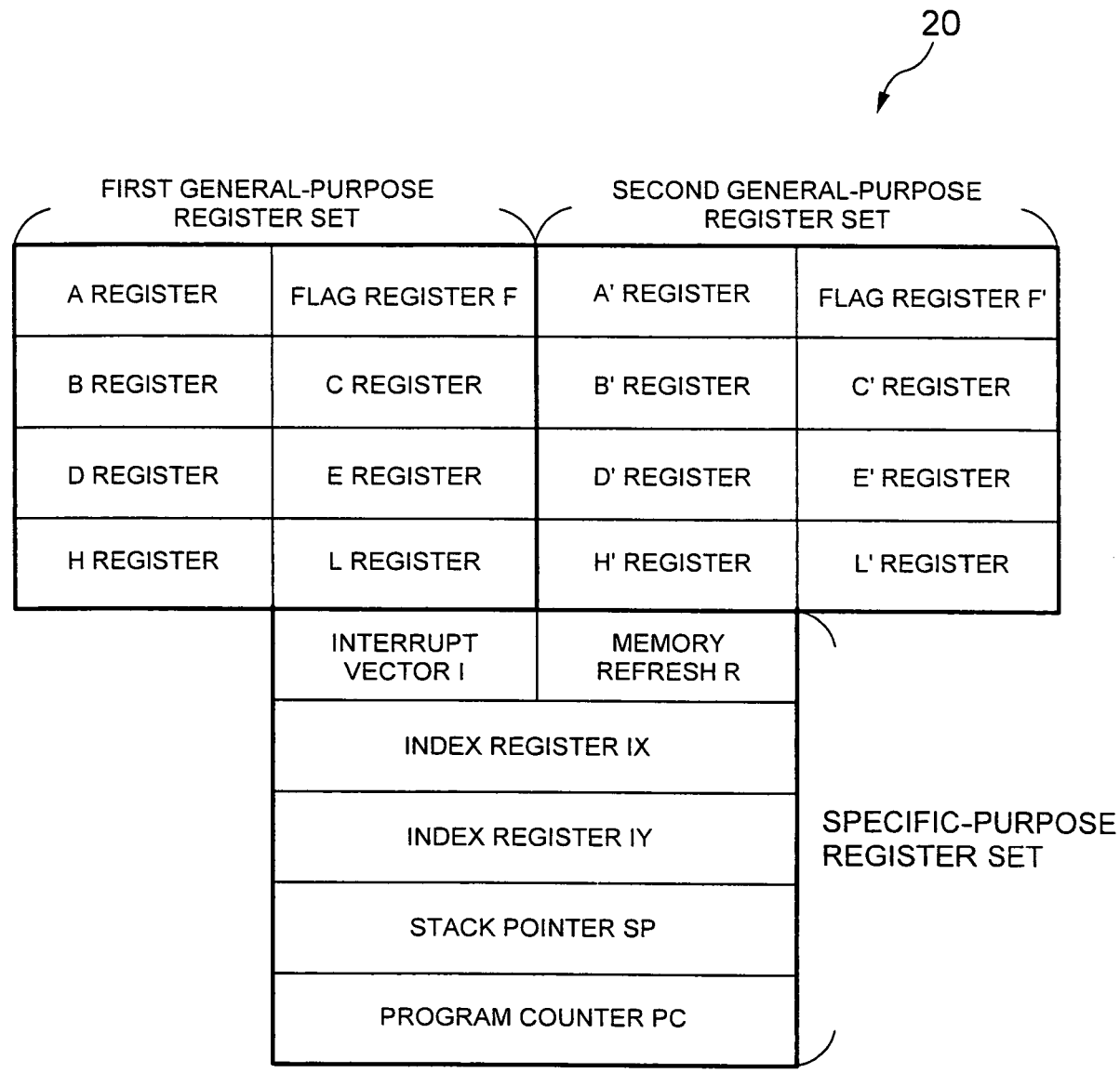
FIG. 2 is a diagram explaining the configuration of a register bank according to the embodiment of the present invention.

The two register banks 20(#0, #1) have a configuration as shown in FIG. 2, for example. As shown in FIG. 2, the two register banks 20(#0, #1) each comprise a first general-purpose register set made up of A, B, C, D, E, H, L registers and a flag register F; a second general-purpose register set that is alternative to the first general-purpose register set; and a specific-purpose register set made up of an interrupt vector I, a memory refresh R, index registers IX, IY, a stack pointer SP, and a program counter PC. That is, in the context switching, one of the first and second general-purpose register sets is selected as a foreground register bank and the other is selected as a background register bank. Meanwhile, the specific-purpose register set is unchanged.

The processor 21 is in charge of general CPU basic processing such as instruction fetch, instruction decoding, instruction execution, the writing back of execution results, and the like. The processor 21 comprises an arithmetic logic unit that performs arithmetic/logic operations, an instruction decoder that decodes instructions read out from the memory 29, register sets that stores a context being currently executed in the processor 21, a memory access unit that controls access to the memory 29 associated with the store-instruction/load-instruction, and an interrupt controller that controls hardware/software interruptions.

That is, the processor 21 has the configuration of a general microcomputer such as a Z80-based microcomputer. Note that the above configuration of the processor 21 is described in, for example, Shinichi Jinpo, "Latest Microprocessor Technology", Nikkei Business Publications, Inc., December 1999, p. 259, FIG. 1.

Furthermore, the processor 21 performs the following processing to implement the multithread/multitask function under the real-time OS environment. When performing context switching in association with the switching of units of processing, the processor 21 grants an execution right to the context stored in one of the two register banks 20(#0, #1) and executes the unit of processing associated with the context having the execution right granted.

When switching contexts, the processor 21 sends a select instruction to the first and second selectors 22, 23, a save area address to the save area address register 26, a restore area address to the restore area address register 27, and a save/restore start signal to the save/restore controller 28.

Hereinafter, a context having the execution right granted by the processor 21 and being currently used by the processor 21 is called a "foreground context", and a register bank 20 storing the foreground context is called a "foreground register bank". And a context having handed over the execution right and to be used in the future by the processor 21 is called a "background context", and a register bank 20 storing the background context is called a "background register bank".

The first selector 22 selects a foreground register bank storing a foreground context to be granted an execution right from the two register banks 20(#0, #1) according to a first select signal generated based on a select instruction from the processor 21, and supplies the foreground context to be granted an execution right to the processor 21.

The second selector 23 selects a background register bank storing a background context to be saved/restored from the two register banks 20(#0, #1) according to a second select signal generated based on the select instruction from the processor 21, and allows the background context to be transferred between the background register bank and the save/restore controller 28.

The storage element 24 is for holding the state of the select instruction output from the processor 21 to the first and second selectors 22, 23 until the next select instruction is generated. The select instruction held in the storage element 24 is the first select signal for the first selector 22, and a signal that the first select signal is inverted into by the inverter element 25 is the second select signal for the second selector 23. The storage element 24 may be, for example, a flip flop element.

The inverter element 25 is provided to have the first and second selectors 22, 23 select respective ones of the two register banks 20(#0, #1), that is, the foreground register bank and the background register bank such that they do not select the same register bank. That is, by providing the inverter element 25, it can be certainly avoided that the first and second selectors 22, 23 select the same register bank 20 conflictingly.

The save area address register 26 stores the save area address of the memory 29 to which a to-be-saved contexts designated by the processor 21 is written.

The restore area address register 27 stores the restore area address of the memory 29 from which a to-be-restored context designated by the processor 21 is read out.

As such, the save area address register 26 and the restore area address register 27 are separate. Hence, the processor 21 can freely designate the save area address and the restore area address.

The save/restore controller 28 reads out a background context having handed over the execution right from the background register bank 20, which is the other than the foreground register bank 20 storing a foreground context, and writes into the memory 29 at the save area address designated by the save area address register 26 (saving). Then, the controller 28 reads out a context to be granted an execution right the next time from the memory 29 at the restore area address designated by the restore area address register 27 and writes into the background register bank 20 (restoring).

When receiving a save/restore start signal from the processor 21, the save/restore controller 28 saves and/or restores a background context between the background register bank selected by the second selector 23 and the memory 29.

Furthermore, in parallel with the unit of processing associated with the foreground context being executed by the processor 21, the save/restore controller 28 saves and/or restores the background context. For example, during the time when a task A of a context A is being executed by the processor 21, the save/restore controller 28 saves the context C of a task C that was being executed in the preceding time period and restores the context of a task B to be executed in the next time period.

Incidentally, the save/restore controller 28 may be embodied to be divided into a save controller that performs only saving and a restore controller that performs only restoring. That is, since the saving and the restoring are carried out by respective dedicated controllers, the saving and the restoring are each improved in degrees of freedom.

Adopted as the memory 29 is, for example, a main memory (SDRAM, DRAM, or the like) directly accessible by the processor 21. That is, compared with the background register bank 20, the memory 29 is slower in write/read speed and larger in storage capacity. Alternatively, a cache memory provided in between the processor 21 and the main memory may be adopted as the memory 29.

Note that the storage area provided by the memory 29 is partitioned into areas to respectively store contexts associated with a respective plurality of units of processing. Moreover, the processor 21 is in charge of address management for the partitioned areas, and with the addresses, the save area address and the restore area address can be designated. As a result, the save/restore controller 28 saves/restores a context into/from the memory 29 in an ordered manner. Also, without a need to manage the addresses of the memory 29, the save/restore controller 28 can dedicate itself to saving/restoring accordingly.

===Basic Operation of the Information Processing Apparatus===

Figure 3:
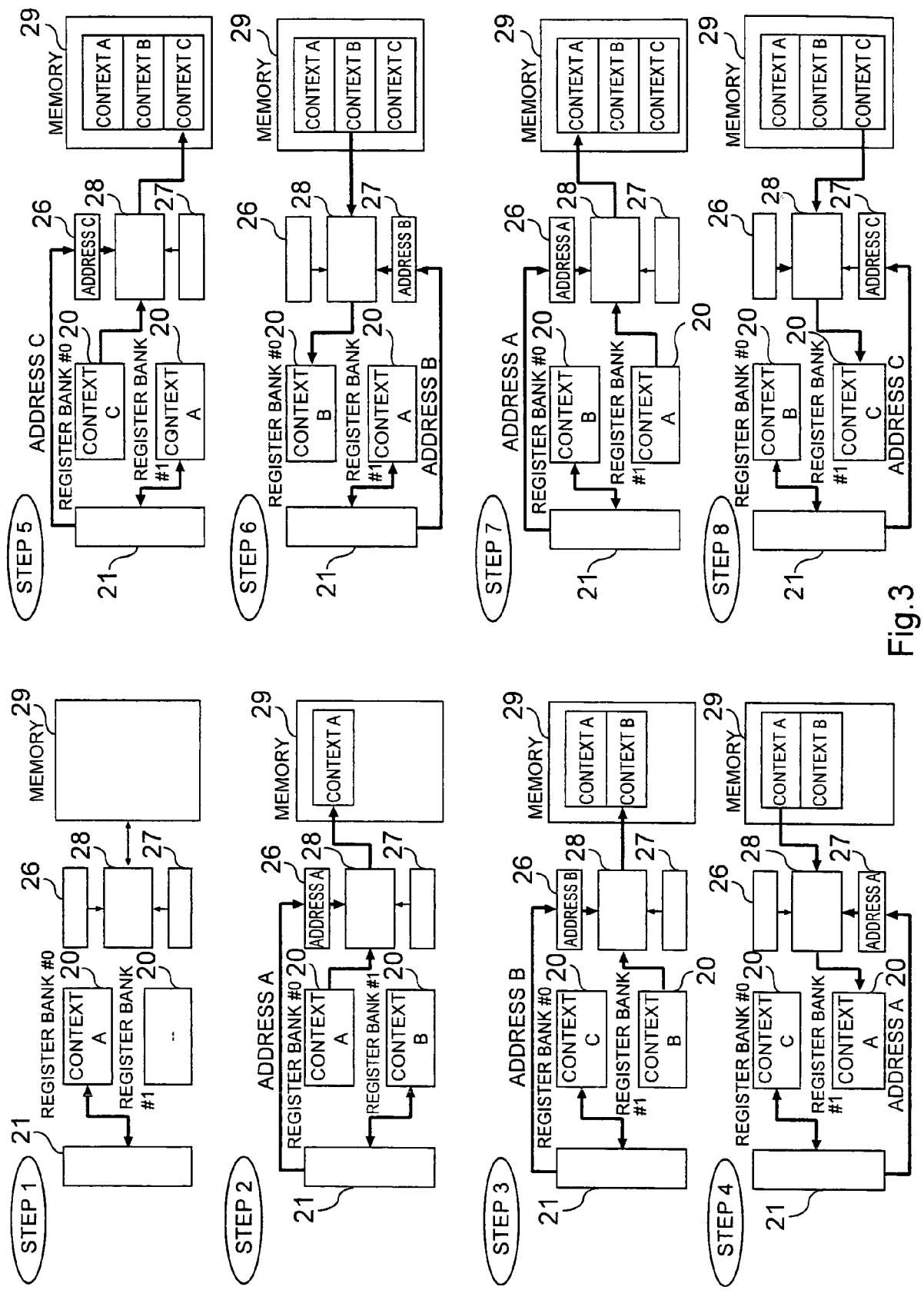
FIG. 3 is a diagram explaining an operation of the information processing apparatus according to the embodiment of the present invention.
Figure 4:
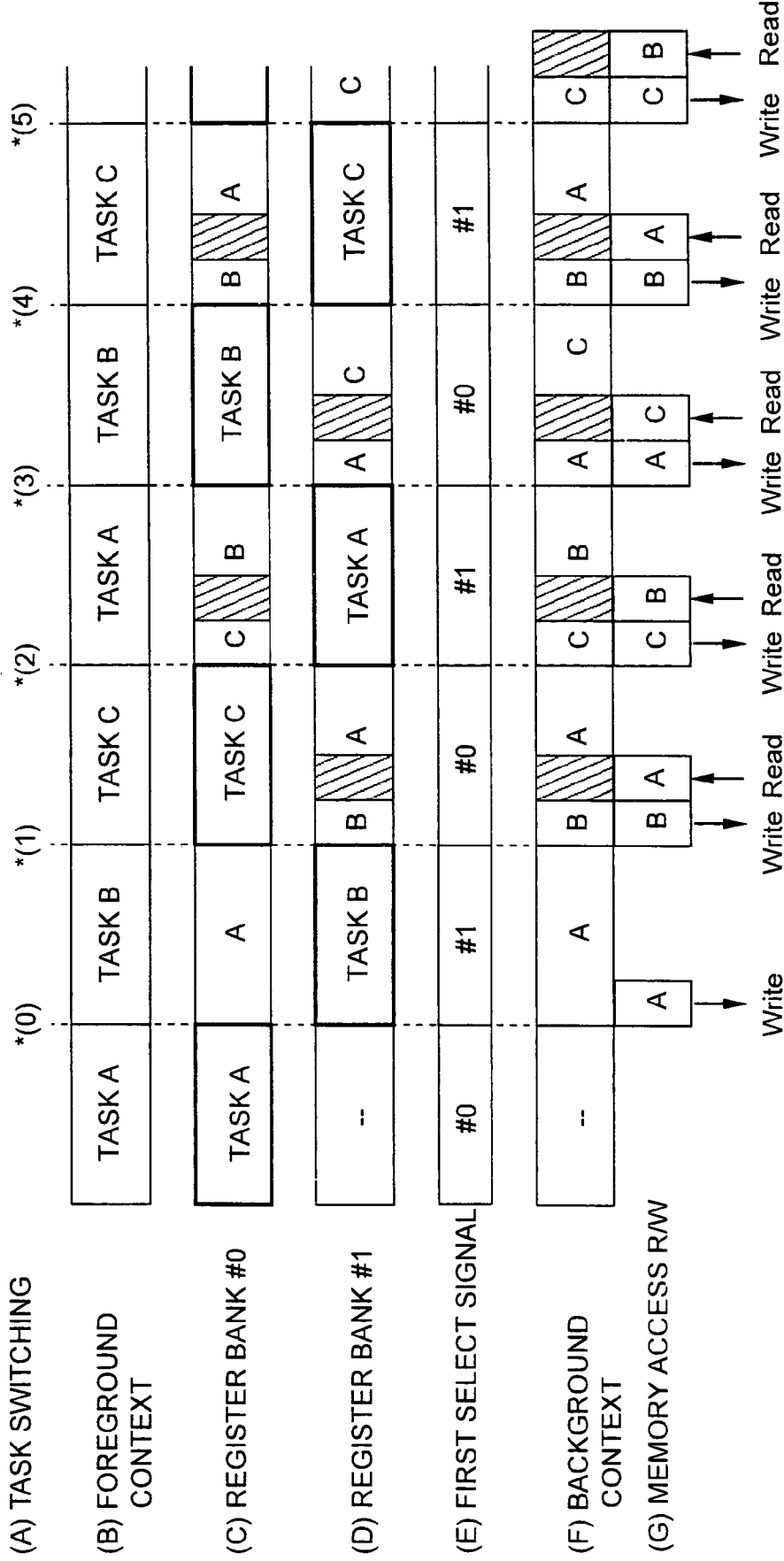
FIG. 4 is a diagram explaining the operation of the information processing apparatus according to the embodiment of the present invention.

The basic operation of the information processing apparatus 200 will be described based on FIGS. 3, 4. FIGS. 3, 4 show the case where in one processor 21, tasks A, B, C are executed according to a round-robin method periodically in predetermined periods and in a predetermined order (A to B to C to A to . . . ).

Referring to FIG. 3, in step 1, the register bank 20(#0) and the register bank 20(#1) are already selected respectively as the foreground register bank 20 and the background register bank 20, and the processor 21 executes task A with context A stored in the register bank 20(#0) (step 1).

Then, in response to an instruction from the multitask OS to switch contexts (context A to B), the processor 21 selects the register bank 20(#1) as the foreground register bank 20, and stores context B therein. Then, the processor 21 executes task B with context B stored in the register bank 20 (#1). Also in parallel with the execution of task B, the processor 21 supplies an address A designating the save area for context A to the save area address register 26. As a result, the save/restore controller 28 reads out the context A from the register bank 20(#0) as the background register bank 20 and writes the context A into the save area of the memory 29 designated by the address A stored in the save area address register 26 (step 2).

Likewise, in response to the next instruction from the multitask OS to switch contexts (context B to C), the processor 21 selects the register bank 20(#0) as the foreground register bank 20, and stores context C therein. Then, the processor 21 executes task C with context C stored in the register bank 20 (#0). Also in parallel with the execution of task C, the processor 21 supplies an address B designating the save area for context B to the save area address register 26. As a result, the save/restore controller 28 reads out the context B from the register bank 20(#1) as the background register bank 20 and writes the context B into the save area of the memory 29 designated by the address B stored in the save area address register 26 (step 3).

Further, in parallel with the execution of task C, the processor 21 supplies an address A of the memory 29 at which the context A is stored to the restore area address register 27. As a result, the save/restore controller 28 reads out the context A from the memory 29 at the address A designated by the restore area address register 27 and updates the status of the register bank 20 (#1) with the context A (step 4).

In response to the next instruction from the multitask OS to switch contexts (context C to A), the processor 21 executes task A, and in parallel therewith, the save/restore controller 28 saves context C to the memory 29 (step 5). Further, the save/restore controller 28 restores context B from the memory 29 (step 6).

In response to the next instruction from the multitask OS to switch contexts (context A to B), the processor 21 executes task B, and in parallel therewith, the save/restore controller 28 saves context A to the memory 29 (step 7), and restores context C from the memory 29 (step 8).

Referring to FIG. 4, (a) of FIG. 4 shows task switching points *, (b) of FIG. 4 shows transition of the status (task) of the foreground context being currently used in the processor 21, (c) of FIG. 4 shows transition of the status (task) of the register bank 20(#0), (d) of FIG. 4 shows transition of the status (task) of the register bank 20(#1), (e) of FIG. 4 shows transition of the first select signal, (f) of FIG. 4 shows transition of the status (task) of the background context subject to saving/restoring, and (g) of FIG. 4 shows the type of access (Write/Read) to the memory 29 by the save/restore controller 28.

For example, in the time period between task switching points *(1) and *(2) (see (a) of FIG. 4 according to the first select signal of (a) of FIG. 4, the register bank 20(#0) is selected as the foreground register bank 20 and according to the second select signal (not shown) that the first select signal is inverted into, the register bank 20(#1) is selected as the background register bank 20. During this time period, context C associated with task C is stored in the register bank 20(#0), and the processor 21 executes task C with context C (see (c) of FIG. 4).

In this time period, after writing context B associated with task B, which was being executed by the processor 21 in the preceding time period, from the register bank 20(#1) into the memory 29, the save/restore controller 28 reads out context A associated with task A to be executed the next time from the memory 29 and updates the status of the register bank 20(#1) therewith (see (f), (g) of FIG. 4).

Thereafter, at task switching point *(2), switching from task C to task A is performed. At this time, the register bank 20(#1) and the register bank 20(#0) are selected as the foreground register bank 20 and the background register bank 20 respectively.

Here, context A associated with task A is stored in the register bank 20(#1), the processor 21 executes task A with context A (see (c) of FIG. 4). Also, in parallel with the execution of task A by the processor 21, after writing context C associated with task C, which was being executed by the processor 21 in the preceding time period, from the register bank 20(#0) into the memory 29, the save/restore controller 28 reads out context B of task B to be executed the next time from the memory 29 and updates the status of the register bank 20(#0) therewith (see (f), (g) of FIG. 4).

===Detailed Operation of the Information Processing Apparatus===

Figure 5:
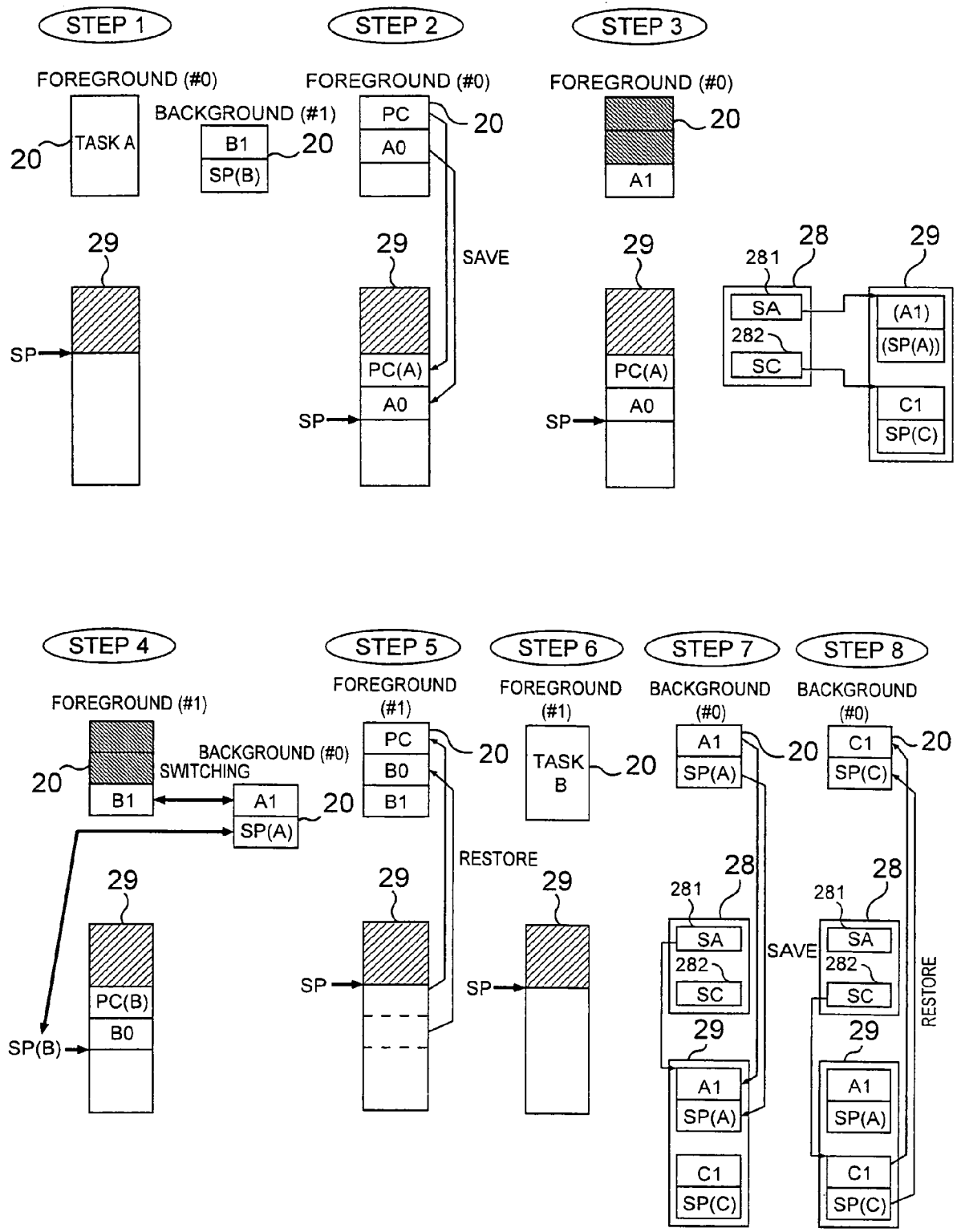
FIG. 5 is a diagram explaining an operation of the information processing apparatus according to the embodiment of the present invention.

The detailed operation of the information processing apparatus 200 will be described based on FIG. 5.

In step 1, the processor 21 executes task A with a context stored in the foreground register bank 20(#0), and a context B1 and stack pointer SP(B) of task B to be executed the next time are stored in the background register bank 20(#1) (step 1).

Then, the processor 21 appreciates a timer interruption through a timer interrupt signal generated by a timer (not shown) in the processor 21. As a result, the processor 21 suspends task A being currently executed, the value PC(A) of the program counter at which the execution of task A is to be resumed and a context A0 of task A are saved into the stack area for task A in the memory 29 (step 2). And in the processor 21, control is passed to a predetermined execution start address (interrupt vector) in a timer interrupt routine where the timer interrupt signal is cleared and the timer is reset and activated for the next timer interruption.

The processor 21, in the above situation, executes the following context switching. That is, the processor 21 acquires the address (save area address SA) of the storage area to/from which the context of task A is saved/restored from a system area in the memory 29. Then, the processor 21 supplies the acquired save area address SA to the save area address register 26. And the save/restore controller 28 places the save area address SA stored in the save area address register 26 into its own save pointer register 281.

Further, the processor 21 acquires the address (restore area address SC) of the storage area to/from which the context of task C is saved/restored from the system area in the memory 29. Then, the processor 21 supplies the acquired restore area address SC to the restore area address register 27. And the save/restore controller 28 places the restore area address SC stored in the restore area address register 27 into its own restore pointer register 282. Then, the processor 21 updates task management information stored in the system area in the memory 29 for the next task and context switching (up to here, step 3).

Then, the processor 21 supplies the select instruction to the first and second selectors 22, 23 and the save/restore start signal to the save/restore controller 28. As a result, the foreground register bank 20(#0) storing a context A1 (the rest of context except A0) of task A is changed by the first and second selectors 22, 23 into a background register bank 20(#0), and the background register bank 20(#1) storing the context B1 of task B is changed into a foreground register bank 20(#1).

Then, the stack pointer SP(B) of task B is restored, and the stack area in the memory 29 that is used by the processor 21 switches to the stack area for task B designated by the stack pointer SP(B) (up to here, step 4).

Then, the processor 21 executes a RTI (Return From Interrupt) instruction, thereby exiting the timer interrupt routine. At this time, a context B0 and a program counter PC (B) of task B are read out from the stack area for task E, designated by the stack pointer SP(B) and stored into the foreground register bank 20(#1) (step 5). As a result, the processor 21 resumes the execution of task B (step 6).

In parallel with the execution of task B by the processor 21, the save/restore controller 28 saves the context A1 of task A stored in the background register bank 20(#0) into the save area for task A in the memory 29 designated by the save area address SA stored in the save pointer register 281. At this time, the stack pointer SP(A) is also saved into the save area for task A in the memory 29 (up to here, step 7).

Further, in parallel with the execution of task B by the processor 21, the save/restore controller 28 re-stores a context C2 of task C stored in the restore area for task C in the memory 29 designated by the restore area address SC stored in the restore pointer register 282 into the background register bank 20(#0). At this time, the stack pointer SP (C) is also restored into the background register bank 20(#0) (up to here, step 8).

As above, according to the information processing apparatus 200 and the context switching method of the present invention, the save/restore controller 28, a save/restore dedicated hardware separate from the processor 21, saves the background context having handed over the execution right from the background register bank 20 into the memory 29 and restores the context to be granted a right of execution from the memory 29 into the background register bank 20. Thus, the load on the processor 21 associated with the saving/restoring is reduced and the saving/restoring is speeded up.

In parallel with a unit of processing associated with the foreground context granted a right of execution being executed by the processor 21, the save/restore controller 28 saves/restores. Thus, the processor 21 can execute a plurality of units of processing in parallel with switching between them in terms of the right of execution, without being affected by the time required for the context switching.

As such, according to the information processing apparatus 200 of the present invention, the total time required for executing a plurality of units of processing can be reduced and a high-performance real-time system excellent in the real-time capability can be realized.

<Other Configurations and Operations of the Information Processing Apparatus>

===Integration of the Address Registers===

With the above embodiment, consider the case where the memory 29 is partitioned according to a predetermined regularity into divisions for storing contexts respectively which divisions are such as units of, for example, 64 addresses placed consecutively. In this case, the save area address register 26 and the restore area address register 27 can be combined into one address register without a need to be separate.

That is, the processor 21 supplies either a save area address or a restore area address to the one address register. And the save/restore controller 28 can calculate the other address from the save area address or the restore area address stored in the one address register based on the predetermined regularity of the divisions of the memory 29.

In the above case where the memory 29 is partitioned into divisions of, for example, 64 addresses, the save/restore controller 28 can obtain a restore area address by calculating a designated save area address plus 64. Note that when calculating the first restore area address from the last restore area address, the overflow of the sum of the designated save area address plus 64 need only be masked.

As such, the save area address register 26 and the restore area address register 27 are combined into one address register, thereby reducing the circuit scale. Moreover, the processor 21 need only designate either save area addresses or restore area addresses in a predetermined order, accordingly reducing the load thereon.

===Selection of Modes for Saving/Restoring===

In the above embodiment, the processor 21 may supply the save/restore controller 28 with a mode selection signal to designate one of a first mode wherein the processor 21 executes saving and restoring consecutively, a second mode wherein the processor 21 executes only the saving, and a third mode wherein the processor 21 executes only the restoring. And the save/restore controller 28 selects one of the first to third modes according to the mode selection signal supplied from the processor 21.

That is, as shown in steps 1, 2, 3 of FIG. 3, at the initial and end stages of executing a plurality of units of processing in parallel, only the saving or the restoring is needed. Hence, by configuring the processor 21 to be able to designate one of the first to third modes, it does not happen to have the save/restore controller 28 perform wasteful processing.

===Saving/Restoring in an Idle Time Period===

In the above embodiment, the processor 21 may supply a status signal to indicate the status of access to the memory 29 by it to the save/restore controller 28. And the save/restore controller 28 identifies idle time periods during which the processor 21 does not access the memory 29 on the basis of the status signal supplied from the processor 21, and performs saving/restoring only during the idle time periods.

Figure 6:
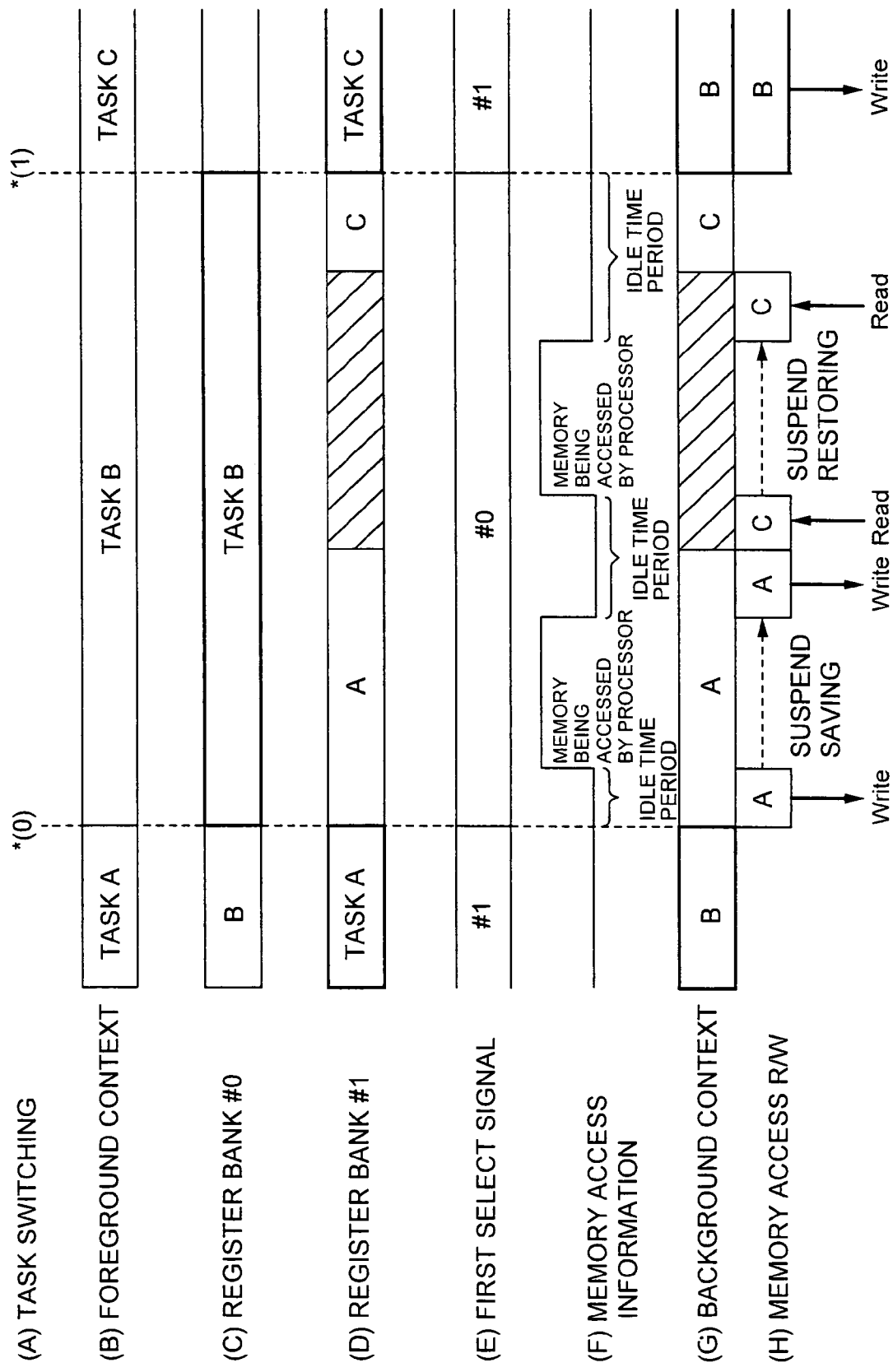
FIG. 6 is a diagram explaining an operation of the information processing apparatus according to the embodiment of the present invention.

FIG. 6 illustrates the operation of the information processing apparatus 200 when saving/restoring in idle time periods on the basis of the status signal. Here, (a) of FIG. 6 shows task switching points *, (b) of FIG. 6 shows transition of the status (task) of the foreground context being currently used in the processor 21, (c) of FIG. 6 shows transition of the status (task) of the register bank 20(#0), (d) of FIG. 6 shows transition of the status (task) of the register bank 20(#1), (e) of FIG. 6 shows transition of the first select signal, (f) of FIG. 6 shows transition of the status signal, (g) of FIG. 6 shows transition of the status (task) of the background context subject to saving/restoring, and (h) of FIG. 6 shows the type of access (Write/Read) to the memory 29 by the save/restore controller 28.

For example, before a task switching point *(0) (see (a) of FIG. 6), the register bank 20(#1) storing context A of task A is selected as the foreground register bank 20, and the register bank 20(#0) storing context B of task B is selected as the background register bank 20. And the processor 21 executes task A with context A stored in the register bank 20(#1) (see (b) of FIG. 6).

Then, at the task switching point *(0), switching from task A to task B is performed, where the register bank 20(#0) changes to the foreground register bank 20, and the register bank 20(#1) changes to the background register bank 20.

At this time, context B associated with task B is stored in the register bank 20(#0), and the processor 21 executes task B with context B (see (c) of FIG. 6). In parallel with task B being executed by the processor 21, the save/restore controller 28 writes context A of task A that was being executed in the preceding time period into the memory 29, and reads out context C of task C to be executed the next time from the memory 29 and updates the status of the register bank 20(#1) therewith.

Consider the case where, while writing context A into the memory 29 (saving), or while reading context C from the memory 29 (restoring), the save/restore controller 28 recognizes that the processor 21 is accessing the memory 29 on the basis of the status signal supplied from the processor 21 (see (f) of FIG. 6). In this case, the save/restore controller 28 suspends the writing of context A into the memory 29 until an idle time period is recognized to appear again on the basis of the status signal supplied from the processor 21 (see (h) of FIG. 6).

As such, the save/restore controller 28 is allowed to save/restore in idle time periods during which the processor 21 does not access the memory 29. As a result, the save/restore controller 28 can save/restore without interrupting access to the memory 29 by the processor 21.

===Busy Signal===

In the above embodiment, while saving or restoring, the save/restore controller 28 may supply a busy signal indicating that saving/restoring is under way to the processor 21. And the processor 21 delays the start of saving/restoring until the busy signal from the save/restore controller 28 is negated.

For example, the processor 21 refrains from supplying the save/restore start signal to the save/restore controller 28 until the busy signal is negated. As a result, the start of saving/restoring can be delayed. Alternatively, the save/restore controller 28 may be configured to not respond to the save/restore start signal from the processor 21 at all until the busy signal is negated. Also in this case, the start of saving/restoring can be delayed.

That is, in the time period that the processor 21 is executing a unit of processing with the foreground context the saving and restoring of the background contexts may not be finished. Accordingly, the processor 21 delays the start of saving/restoring until the busy signal indicating that saving/restoring is under way is negated, thereby avoiding the above incident.

Note that the save/restore controller 28 may perform saving/restoring with intentionally avoiding time periods of access to the memory 29 by the processor 21 on the basis of the status signal supplied from the processor 21. That is access to the memory 29 by the processor 21 is prioritized over the saving/restoring. In this case, needless to say, the busy signal is not needed.

===Case Where Total Number of Tasks≦Total Number of Register Banks===

In the above embodiment, when the total number of units of processing to be executed in parallel is at or below the total number of register banks 20, the processor 21 may supply a save/restore prohibition signal to prohibit the saving/restoring to the save/restore controller 28. When receiving the save/restore prohibition signal from the processor 21, the save/restore controller 28 does not perform the saving/restoring.

That is, when the total number of units of processing to be executed in parallel is at or below the total number of register banks 20, there is no need to save/restore a context into/from the memory 29. In this case, if prohibiting the saving/restoring, the processor 21 can perform context switching at high speed only by switching between the register banks 20 (the foreground and background register banks).

===Configuration with Three or More Register Banks===

In the above embodiment, interrupt control register banks 30 are further provided. Thus, three or more register banks (20, 30) are provided in the information processing apparatus 200.

Figure 7:
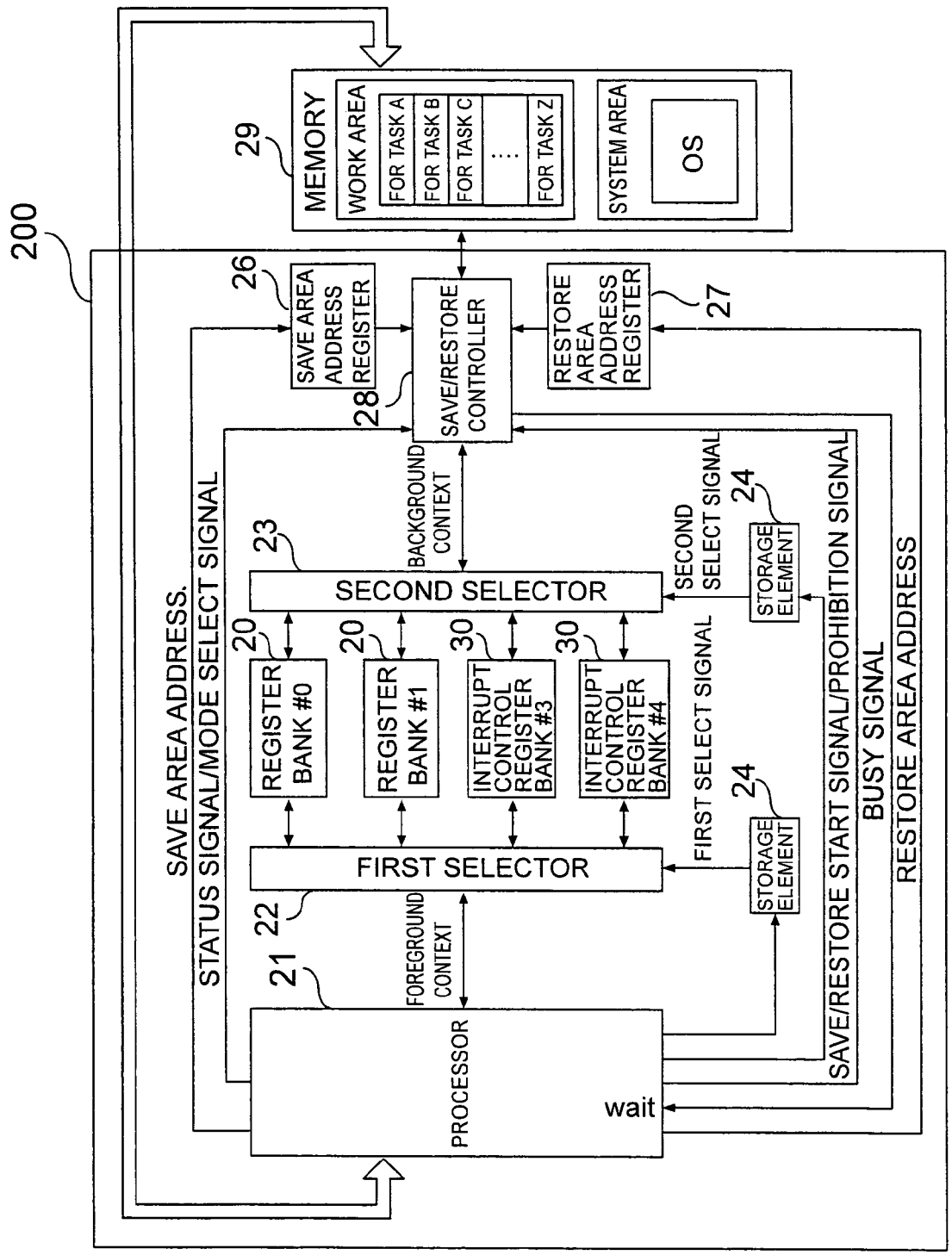
FIG. 7 is a diagram explaining the configuration of an information processing apparatus according to another embodiment of the present invention.
Figure 8:
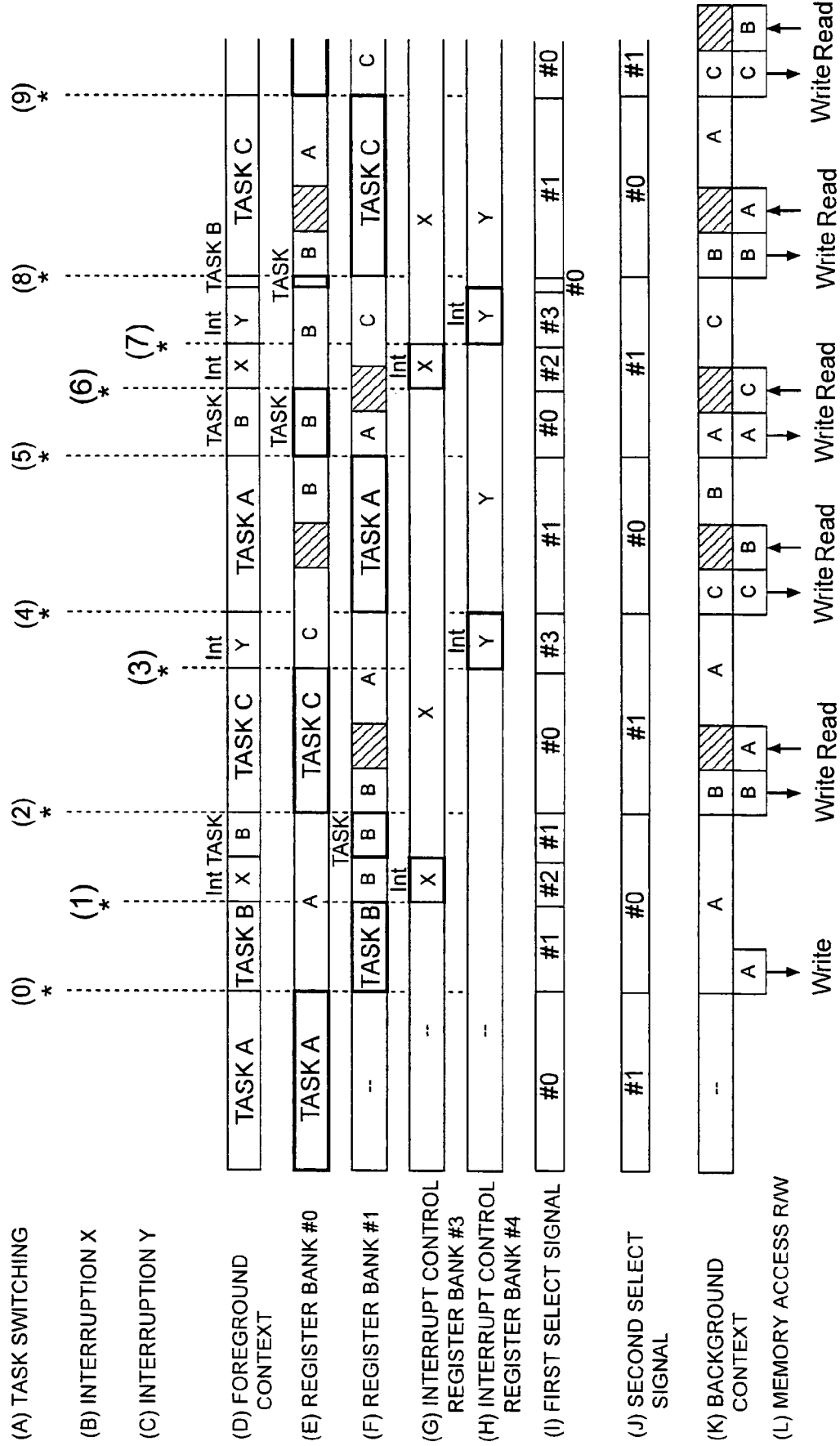
FIG. 8 is a diagram explaining an operation of the information processing apparatus according to the other embodiment of the present invention.
Figure 9:
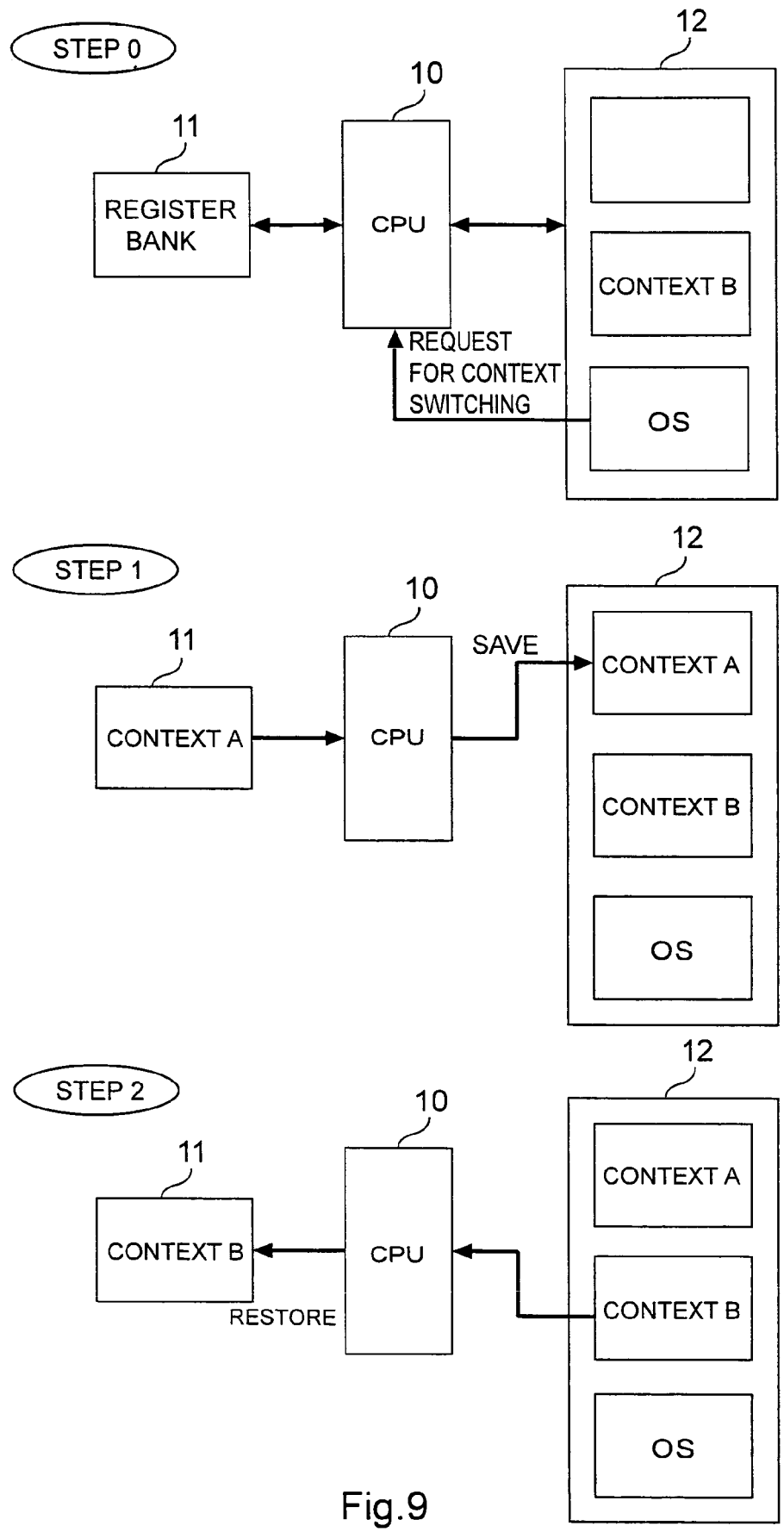
FIG. 9 is a diagram explaining conventional context switching.
Figure 10:
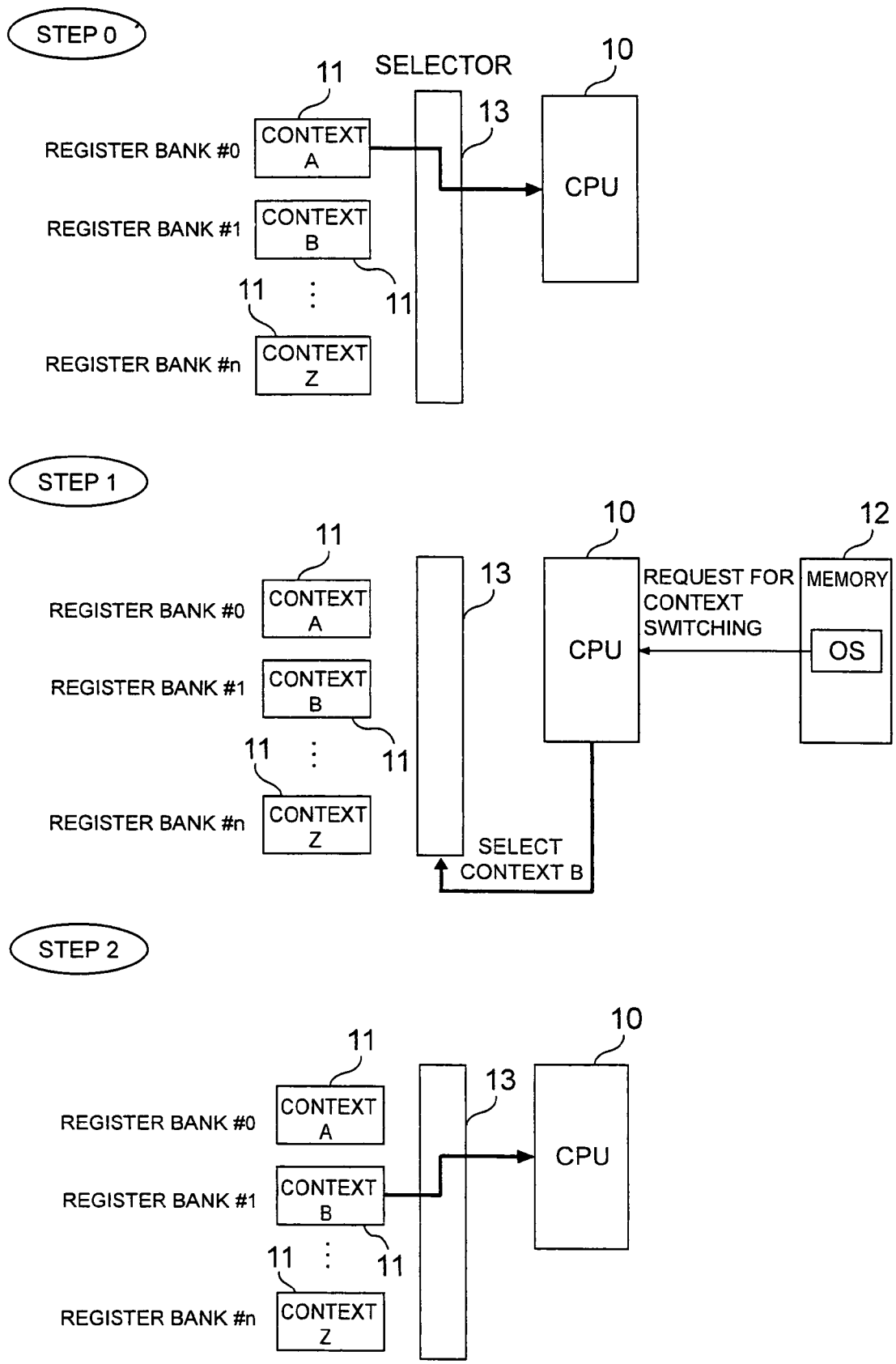
FIG. 10 is a diagram explaining conventional context switching.
Figure 11:
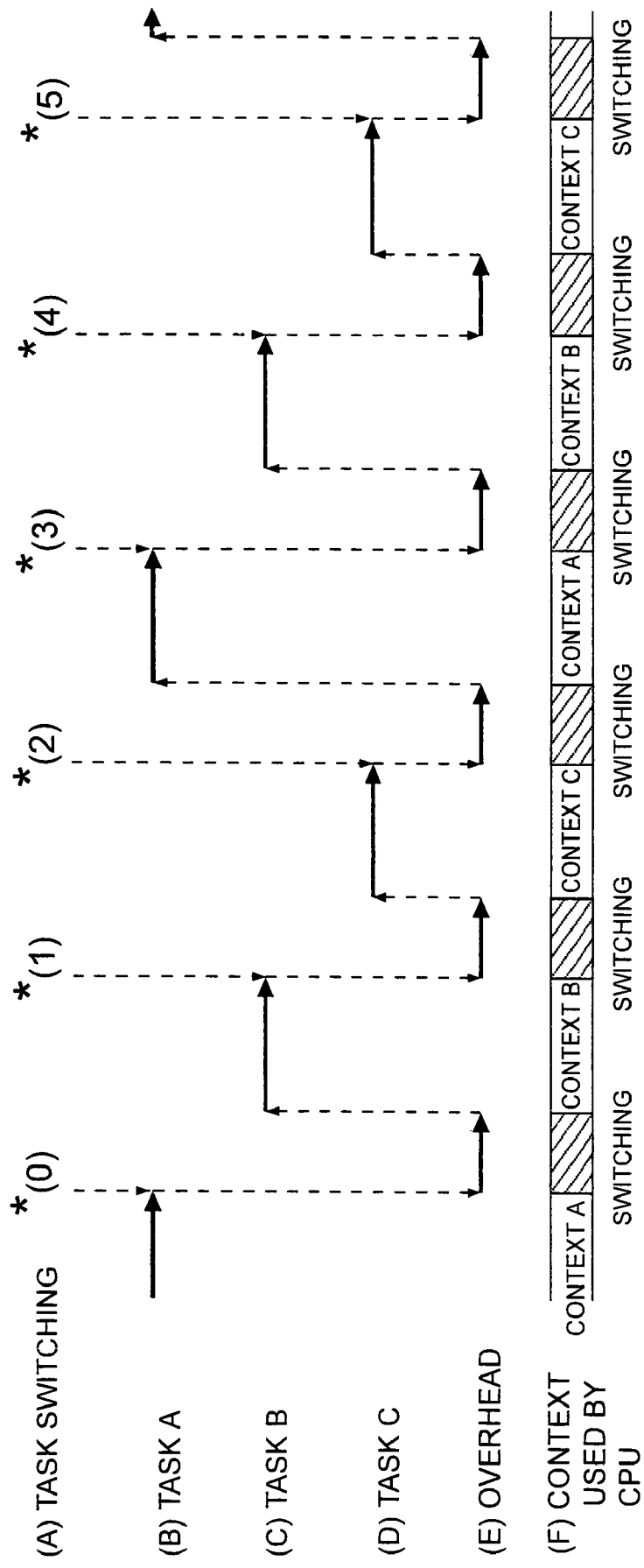
FIG. 11 is a diagram explaining conventional context switching.

FIG. 7 illustrates the configuration of the information processing apparatus 200 further provided with two interrupt control register banks 30(#0, #1) according to another embodiment of the present invention. FIG. 8 illustrates the basic operation of the information processing apparatus 200 further provided with the two interrupt control register banks 30(#0, #1). Here, (a) of FIG. 8 shows task switching points *, (b) of FIG. 8 shows timings * of accepting interruption for an interrupt factor X, (c) of FIG. 8 shows timings * of accepting interruption for an interrupt factor Y, (d) of FIG. 8 shows transition of the status (task) of the foreground context being currently used in the processor 21, (e) of FIG. 8 shows transition of the status (task) of the register bank 20(#0), (f) of FIG. 8 shows transition of the status (task) of the register bank 20(#1), (g) of FIG. 8 shows transition of the status (interrupt factor X) of the interrupt control register bank 30(#3), (h) of FIG. 8 shows transition of the status (interrupt factor Y) of the interrupt control register bank 30(#4), (i) of FIG. 8 shows transition of the first select signal, (j) of FIG. 8 shows transition of the second select signal, (k) of FIG. 8 shows transition of the status (task) of the background context subject to saving/restoring, and (l) of FIG. 8 shows the type of access (Write/Read) to the memory 29.

For example, between task switching points *(2) and *(4) (see (a) of FIG. 8), the register bank 20(#0) storing context C of task C is selected as the foreground register bank 20, and the register bank 20(#1) storing context B of task B is selected as the background register bank 20.

Thus, the processor 21 executes task C with context C stored in the register bank 20(#0) (see (d) of FIG. 8). In parallel with task C being executed by the processor 21, the save/restore controller 28 writes the context B of task B that was being executed in the preceding time period from the register bank 20(#1) into the memory 29, and reads out context A of task A to be executed the next time from the memory 29 and updates the status of the register bank 20(#1) therewith (see (k), (l) of FIG. 8).

Here, suppose that at timing *(3) of accepting interruption, the processor 21 accepts interruption due to the interrupt factor Y while executing task C (see (d) of FIG. 8). At this time, the status of the interrupt control register bank 30(#4) becomes a context Y associated with the interrupt factor Y without affecting the status of the register banks 20(#0, #1) (see (h) of FIG. 8).

That is, even if interruption due to the interrupt factor Y occurs, the status of the register bank 20(#0) continues to be the context C of task C. Also, the save/restore controller 28 continues the saving of the context B into the memory 29 and the restoring of the context A from the memory 29.

That is, by providing the interrupt control register banks 30, even if interruption occurs in the processor 21 such as hardware interruption and software interruption (exception, watchdog timer, etc.), the save/restore controller 28 can continue to save/restore.

Although the preferred embodiments of the present invention have been described, the above embodiments are provided to facilitate the understanding of the present invention and not intended to limit the present invention. It should be understood that various changes and alterations can be made therein without departing from spirit and scope of the invention and that the present invention includes its equivalents.

What is claimed is:

1. An information processing apparatus that, when executing a plurality of predetermined units of processing, executes the predetermined units of processing in parallel by switching between contexts associated with the respective predetermined units, the processing apparatus comprising:
    a plurality of register banks that respectively store the contexts associated with the respective predetermined units of processing;
    a processor that, in the context switching, grants a right of execution to a context stored in one of the plurality of register banks and executes a unit of processing associated with the context having the right of execution granted; and
    a save/restore controller that performs saving and restoring wherein the saving executes to read out a context having handed over the right of execution from one of the other register banks than the one register bank storing the context having the right of execution granted and write into a memory that is distinct from the plurality of register banks, and that is accessible by the processor, and the restoring executes to read out a context to be granted the right of execution the next time from the memory and write into the one of the other register banks, the save/restore controller performing the saving and the restoring in parallel with the processor executing the unit of processing associated with the context having the right of execution granted.

2. The information processing apparatus according to claim 1, further comprising:

a first selector that, according to a selection instruction from the processor, selects a register bank in which a context to be granted the right of execution is stored from the plurality of register banks and supplies the context to the processor;

a second selector that, according to a selection instruction from the processor, selects a register bank in which a context subject to the saving and/or the restoring is stored from the plurality of register banks and allows transfer of the context between the selected register bank and the save/restore controller;

a save area address generator that stores a save area address of the memory to which a context subject to the saving and designated by processor is written; and a restore area address generator that stores a restore area address of the memory from which a context subject to the restoring and designated by processor is read out, wherein the processor, in the context switching, supplies the selection instructions to the first and second selectors, the save area address to the save area address generator, the restore area address to the restore area address generator, and a save/restore start signal to the save/restore controller, and wherein when receiving the save/restore start signal from the processor, the save/restore controller performs the saving based on the save area address stored in the save area address generator and/or the restoring based on the restore area address stored in the restore area address generator between a register bank selected by the second selector according to the selection instruction and the memory.

3. The information processing apparatus according to claim 1, further comprising:

a first selector that, according to a selection instruction from the processor, selects a register bank in which a context to be granted the right of execution is stored from the plurality of register banks and supplies the context to the processor;

a second selector that, according to a selection instruction from the processor, selects a register bank in which a context subject to the saving and/or the restoring is stored from the plurality of register banks and allows transfer of the context between the selected register bank and the save/restore controller; and an address register that stores either a save area address of the memory to which a context subject to the saving and designated by processor is written or a restore area address of the memory from which a context subject to the restoring and designated by processor is read out, wherein the processor, in the context switching, supplies the selection instructions to the first and second selectors, the save area address or the restore area address to the address register, and a save/restore start signal to the save/restore controller, and wherein when receiving the save/restore start signal from the processor, the save/restore controller performs the saving and/or the restoring based on the save area address or the restore area address stored in the address register between a register bank selected by the second selector according to the selection instruction and the memory.

4. The information processing apparatus according to claim 2, wherein a storage area of the memory is partitioned into areas to respectively store contexts associated with respective units of processing, and wherein the save area address and/or the restore area address is designated with the addresses of the partitioned-into areas.

5. The information processing apparatus according to claim 2, wherein the first and second selectors select respective ones from the register banks such that they do not select a same register bank.

6. The information processing apparatus according to claim 2, wherein the register banks are two register banks that respectively store a context granted the right of execution by the processor and a context subject to the saving or the restoring.

7. The information processing apparatus according to claim 6, further comprising:

an interrupt control dedicated register bank that stores a context to be used in interrupt control by the processor.

8. The information processing apparatus according to claim 2, wherein the processor supplies the save/restore controller with a mode selection signal that designates one of a first mode in which to perform the saving and the restoring, a second mode in which to perform the saving, and a third mode in which to perform the restoring, and wherein the save/restore controller selects one of the first to third modes according to the mode selection signal supplied from the processor.

9. The information processing apparatus according to claim 2, wherein the processor supplies a status signal indicating status of access to the memory by it to the save/restore controller, and wherein the save/restore controller identifies an idle time period during which the processor does not access the memory on the basis of the status signal supplied from the processor, and is allowed to perform the saving and/or the restoring during the idle time period.

10. The information processing apparatus according to claim 2, wherein while performing the saving or the restoring, the save/restore controller supplies a busy signal indicating that the saving/restoring is under way to the processor, and wherein the processor or the save/restore controller delays the start of the saving and/or the restoring the next time until the busy signal is negated.

11. The information processing apparatus according to claim 2, wherein where the number of units of processing to be executed is at or below the number of the register banks, the processor supplies a save/restore control signal to start or prohibit the saving and the restoring to the save/restore controller, and wherein when receiving the save/restore control signal from the processor, the save/restore controller starts or stops itself from performing the saving and the restoring.

12. An information processing apparatus which, when executing a plurality of predetermined units of processing, executes the predetermined units of processing in parallel by switching between contexts associated with the respective predetermined units, the processing apparatus comprising:

a plurality of register banks that respectively store the contexts associated with the respective predetermined units of processing;

a processor that, in the context switching, grants a right of execution to a context stored in one of the plurality of register banks and executes a unit of processing associated with the context having the right of execution granted;

a save controller that performs saving in which to read out a context having handed over the right of execution from one of the other register banks than the one register bank storing the context having the right of execution granted and write into a memory that is distinct from the plurality of register banks, and that is accessible by the processor; and a restore controller that performs restoring in which to read out a context to be granted the right of execution the next time from the memory and write into the one of the other register banks, the save controller and the restore controller performing the saving and/or the restoring in parallel with the processor executing the unit of processing associated with the context having the right of execution granted.

13. A method for an information processing apparatus of switching between contexts associated with a respective plurality of predetermined units of processing so as to execute the predetermined units of processing in parallel, the method comprising:

storing the contexts associated with the respective plurality of predetermined units of processing in a plurality of register banks respectively;

in the context switching, granting a right of execution to a context stored in one of the plurality of register banks and executing, by a processor, a unit of processing associated with the context having the right of execution granted; and by a save/restore controller, in parallel with executing by the processor the unit of processing associated with the context having the right of execution granted, performing saving and restoring wherein the saving executes to read out a context having handed over the right of execution from one of the other register banks than the one register bank storing the context having the right of execution granted and write into a memory that is distinct from the plurality of register banks, and that is accessible by the processor, and the restoring executes to read out a context to be granted the right of execution the next time from the memory and write into the one of the other register banks.

* * * * *